United States Patent [19]

Tournut et al.

[11] 4,025,481

[45] May 24, 1977

[54] METHOD FOR THE PREPARATION OF AQUEOUS DISPERSIONS OF POLYTETRAFLUOROETHYLENE WITH HALOGENATED HYDROCARBON AS STABILIZING AGENT

[75] Inventors: Claude Tournut, Saint-Genis Laval; Edouard Grimaud, Oullins, both of France

[73] Assignee: Produits Chimiques Ugine Kuhlmann, France

[22] Filed: May 22, 1975

[21] Appl. No.: 580,033

Related U.S. Application Data

[63] Continuation of Ser. No. 433,711, Jan. 16, 1974, abandoned, which is a continuation of Ser. No. 218,599, Jan. 17, 1972, abandoned.

[30] Foreign Application Priority Data

Jan. 28, 1971 France .................. 71.02800

[52] U.S. Cl. .............. 260/29.6 F; 260/29.6 MP; 526/206; 526/217; 526/220; 526/229; 526/233
[51] Int. Cl.² ............................ C08L 27/18
[58] Field of Search ..................... 260/29.6 F

[56] References Cited

UNITED STATES PATENTS

| | | | |
|---|---|---|---|
| 2,662,065 | 12/1953 | Berry | 260/29.6 F |
| 2,965,595 | 12/1960 | Brinker et al. | 260/29.6 F |
| 3,066,122 | 11/1962 | Brinker et al. | 260/29.6 F |
| 3,105,824 | 10/1963 | Green et al. | 260/29.6 F |
| 3,142,665 | 7/1964 | Cardinal et al. | 260/29.6 F |
| 3,345,317 | 10/1967 | Hoashi | 260/29.6 F |
| 3,639,328 | 2/1972 | Downer | 260/29.6 F |
| 3,658,742 | 4/1972 | Fish et al. | 260/29.6 F |
| 3,752,796 | 8/1973 | Mueller et al. | 260/29.6 F |

*Primary Examiner*—Harold D. Anderson
*Attorney, Agent, or Firm*—Pennie & Edmonds

[57] ABSTRACT

This invention relates to a method for the preparation of aqueous dispersions of polytetrafluoroethylene comprising polymerizing tetrafluoroethylene in an aqueous medium containing a polymerization initiator and an appropriate emulsifying agent as well as other necessary additives in the presence of a stabilizing amount of a stabilizing agent selected to be a saturated halogenated acyclic or cyclic hydrocarbon containing less than about 20 carbon atoms or an unsaturated halogenated acyclic or cyclic hydrocarbon containing less than about 20 carbon atoms which is not copolymerizable with the tetrafluoroethylene under the reaction conditions, or a mixture of said halogenated hydrocarbons.

9 Claims, No Drawings

METHOD FOR THE PREPARATION OF AQUEOUS DISPERSIONS OF POLYTETRAFLUOROETHYLENE WITH HALOGENATED HYDROCARBON AS STABILIZING AGENT

This is a continuation of application Ser. No. 433,711, filed Jan. 16, 1974, which is in turn a continuation of Ser. No. 218,599, filed Jan. 17, 1972, both now abandoned.

BACKGROUND OF THE INVENTION

I. Field of the Invention

This invention relates to a method for preparing aqueous dispersions of polytetrafluorethylene (PTFE).

II. Description of the Prior Art

The polymerization of tetrafluoroethylene (TFE) in emulsified form is a known technique which results in aqueous dispersions of polytetrafluoroethylene, the latter being useful for numerous industrial applications including the coating of metals and other substrates, in impregnating fibers and fabrics, in the preparation of coatings and lacquers and for the production of powders by coagulation for lubricated extrusion.

Aqueous dispersions of polytetrafluoroethylene are prepared according to processes now in use by polymerizing a gaseous monomer (or mixture of different monomers where copolymers are sought) with an aqueous solution containing a polymerization initiator susceptible of forming free radicals at the l polymerization temperature, optionally a buffering agent to maintain the pH of the reaction medium at a given level and an emulsifying agent which is generally an alkaline or ammonium salt of a carboxylic or sulfonic acid in which the carbon chain contains only fluorine, and optionally, chlorine atoms, said polymerizing step being carried out in an autoclave resistant to pressure.

The polytetrafluoroethylene dispersions obtained by these known methods are poorly stable and it is scarcely possible to obtain a concentration of polytetrafluoroethylene greater than 10 to 15%.

A significant improvement can be obtained according to French Pat. No. 1,019,304 of May 19, 1950 by adding as a stabilizing agent to the polymerization medium, from 0.1 to 12% by weight of the aqueous dispersion of a saturated hydrocarbon containing more than 12 carbon atoms which hydrocarbon is liquid under the polymerization conditions.

However, this process presents the disadvantage of rendering the cleaning of the polymerization autoclave difficult leading to down-time which is incompatible with industrial production, particularly in the case when a paraffinic hydrocarbon which is a solid at ambient temperature is used. Moreover, if the hydrocarbon employed in the process is a liquid, its total removal from the dispersion requires rather time-consuming decantation procedures which in practice lead to a significant loss of polytetrafluoroethylene. Finally, if the removal of hydrocarbon is not perfectly complete, residual traces thereof can cause contamination of the final product.

Another improvement, proposed by Belgium patent No. 678,637 of March 29, 1966 comprises using as a stabilizing agent, a paraffinic halogenated hydrocarbon having 1 to 3 carbon atoms, in particular, 1, 1, 2 - trifluoro - 1, 2, 2 - trichloroethane. However, the use of this process is limited because of the necessity of having to employ polymerization temperatures between 5 and 30° C as well as having to use large quantities of the chlorofluorinated hydrocarbon, namely, from 50 to 500 gm/liter of aqueous dispersion. The process thus requires recovery of the stabilizer by decanting the dispersion but in practice, this leads to a loss of stabilizer.

SUMMARY OF THE INVENTION

It has been discovered that use as a stabilizing agent of a very small quantity of an acyclic or cyclic saturated halogenated hydrocarbon containing less than 20 carbon atoms or an acyclic or cyclic unsaturated halogenated hydrocarbon containing less than about 20 carbon atoms which is not copolymerizable with tetrafluoroethylene under the reaction conditions, or a mixture of said halogenated hydrocarbons results in concentrated dispersions of polytetrafluoroethylene of excellent purity and stability.

The above-described halogenated hydrocarbons are generally known to act in polymerization as chain transfer agents which lower the average molecular weight of the polymers obtained. It has been unexpectedly discovered that in the case of polymerizing tetrafluoroethylene in emulsified form, the introduction of a very small amount of one or more of these halogenated hydrocarbons hardly reduces the molecular weight of the resulting polytetrafluoroethylene but considerably increases the stability of aqueous dispersions of the polymer.

This invention is a method for the preparation of aqueous dispersions of polytetrafluoroethylene comprising polymerizing tetrafluoroethylene in an aqueous medium containing a polymerization initiator and an appropriate emulsifying agent as well as other necessary additives, in the presence of a stabilizing agent selected to be a saturated halogenated acyclic or cyclic hydrocarbon containing less than about 20 carbon atoms or an unsaturated halogenated acyclic or cyclic hydrocarbon containing less than about 20 carbon atoms which is not copolymerizable with the tetrafluoroethylene under the reaction conditions, or a mixture of said hydrocarbons, said stabilizing agent being generally employed at a level of from about 10 to 10,000 parts per million by weight of aqueous medium.

DESCRIPTION OF THE PREFERRED EMBODIMENTS

Numerous halogenated hydrocarbons are useful as stabilizing agents according to this invention including for example, $CCl_4$, $CHCl_3$ $CH_2Cl_2$, $CFCl_3$, $CF_2Cl_2$ $CHF_2Cl$, $CF_2ClBr$, $CF_2ClCFCl_2$, $CFCl_2-CFCl_2$, $CF_3-CCl_3$, $CH_3CCl_3$, $CH_2CL-CH_2Cl$, $CHCl_2-CHCl_2$, $C_4F_9CH = CH_2$, $C_6F_{13}CH = CH_2$, $C_8F_{17}CH = CH_2$, hexachlorocyclohexane and benzylchloride. Many other halogenated hydrocarbons may be employed as will be readily apparent to one skilled in the art.

The amount of stabilizer to be used depends upon the particular stabilizer selected and the temperature of polymerization, however, it is generally advantageous to employ the stabilizer from about 20 to 500 parts per million by weight of aqueous medium. This amount may be even lower if there is no need to recover the stabilizer after polymerization. The amount of the present stabilizer which is lost is negligible and is considerably lower than the loss incurred by using, in accordance with known processes, the much larger amounts of chain transfer agents conventionally used.

With the exception of the stabilization conditions, polymerization according to this invention is carried out by means of known and conventional techniques.

Polymerization is initiated by free radicals which are obtained from the decomposition of a hydrosoluble peroxide such as succinyl peroxide or alkaline or ammonium persulfate. The persulfate is used alone if the polymerization temperature is greater than about 50° C. or together with a reducing agent such as ferrous salt, silver nitrate and sodium bisulfite if the contrary is the case. The pH can be maintained as alkaline using as a buffering agent, a phosphate, pyrophosphate or alkaline or ammonium borate.

The most commonly employed emulsifiers are the fluorinated or chlorinated salts, especially, the sodium or ammonium salts of perfluoromonocarboxylic acids having from 6 to 11 carbon atoms such a ammonium perfluoroctanoate. The emulsifiers are added to the aqueous solution either all at once at the start of polymerization or progressively during the course of polymerization as described in French Pat. No. 1,550,055.

The polymerization temperature is generally between about 5° and 100° C and the pressure between about 1 and 100 bars and advantageously between about 10 and 25 bars.

The mechanical stability of the dispersions prepared according to this invention can be determined by stirring previously diluted dispersions of polytetrafluoroethylene of 10% concentration at ambient temperature using a four paddle stirrer in a cylindrical vessel equipped with a counter-rotating four paddle stirrer similar to the apparatus described by J. F. Lontz in Industrial and Engineering Chemistry 1952, Vol. 44, page 1805.

The total duration of agitation at the speeds previously determined as necessary to obtain coagulation permits evaluation of the stability of the dispersion by comparison to the following arbitrary scale:

| Duration of Agitation | Stability |
|---|---|
| 0 to 5 minutes at 250 r.p.m. | weak |
| 5 to 10 minutes at 250 r.p.m. | moderate |
| 10 to 30 minutes at 250 r.p.m. | high |
| 30 minutes at 250 r.p.m. and 30 minutes at 350 r.p.m. | very high |
| No coagulation after 30 minutes at 250 r.p.m., 30 minutes at 350 r.p.m. and 30 minutes at 450 r.p.m. | exceptional |

The following examples illustrate the preparation of aqueous dispersions of polytetrafluoroethylene according to the method of this invention.

EXAMPLE 1

20 liters of water and 8 grams of ammonium perfluoroctanoate were introduced into a carefully degassed stainless steel autoclave. After heating to 65° C, gaseous tetrafluoroethylene was introduced into the autoclave until a pressure of 20 bars was reached followed by 5 ml 1,1,2-trifluoro-1,2,2-trichloroethane and 4 grams of ammonium persulfate. Agitation was started and the pressure of the tetrafluoroethylene increased to 22 bars. Polymerization began at once and resulted in a reduction in pressure. The pressure was maintained between 20 and 22 bars by successive introduction of monomer and the temperature was also kept at 65 ± 1° C while 47 grams of ammonium perfluoroctanoate was steadily added. After 42 minutes, agitation was stopped, the remaining monomer was degassed and the autoclave opened. The dispersion thus obtained presented a high stability and contained only trace amounts of polymer in the form of a powder. After evacuation, the autoclave was easily cleaned by a simple rinsing with water.

The product dispersion had a concentration of 35.5% polytetrafluoroethylene. The dispersed particles possessed a regular shape and had a diameter of from 0.2 to 0.3μ. The stability of this dispersion, determined according to the test method set forth hereinabove, was high but it was still possible to coagulate the polytetrafluoroethylene by means of mechanical agitation in order to yield a powder for paste extrusion.

The specific weight of the polymer obtained, measured according to ASTM method 1457 — 62T was 2.195.

EXAMPLE 2

For purposes of comparison, Example 1 was repeated but without using the stabilizing agent according to this invention. Polymerization was stopped after 18 minutes because the moderately stable dispersion obtained began to coagulate when the concentration of the dispersion attained 17% polytetrafluoroethylene. The amount of polymer present in the form of a powder was high.

EXAMPLE 3

EXAMPLE 1 was repeated with the exception that trifluorotrichloroethane was substituted by 0.2 ml carbon tetrachloride. Within one hour, a 39.5% concentration of dispersed polytetrafluoroethylene was obtained without formation of powder in the autoclave. The mechanical stability of this dispersion was very high and the specific weight of the polymer was 2.21.

EXAMPLE 4

20 liters of water, 0.5 gram of sodium persulfate, 0.75 gram of Mohr's salt (ferrous ammonium sulfate), 6 grams of sodium pyrophosphate, 11 grams of sodium perfluoroctanoate and 0.2 ml of carbon tetrachloride were introduced into the same autoclave used in EXAMPLE 1. Polymerization was carried out at a temperature between 13° and 37° C under a pressure of tetrafluoroethylene of from 20 to 22 bars while during the course of polymerization, 69 grams of sodium perfluoroctanoate were added.

Within 58 minutes, a 34.3% concentration of dispersed polytetrafluoroethylene in the absence of powder was obtained. The mechanical stability of this dispersion was high. The polymer particles were regular and approximately spherical with an average diameter of 0.25 μ. The specific weight of the polymer was 2.21.

EXAMPLE 5

EXAMPLE 4 was repeated using 0.5 ml of carbon tetrachloride and substituting the initial emulsifier with sodium perfluorohexanoate. Within 55 minutes, a 37% concentration of dispersed polytetrafluoroethylene particles of an average diameter of 0.4 μ and having high stability was obtained. By way of comparison, when the operation was carried out with the same emulsifier and using a liter of petroleum jelly in place of carbon tetrachloride, the polymerization was stopped when the concentration reached 14% because the dispersion started to coagulate.

EXAMPLE 6

A series of polymerizations were carried out in a 3 liter autoclave containing 1.6 liters of water, 0.32 gram of ammonium persulfate and 6.4 grams of ammonium perfluoroctanoate added during polymerization and using 0.5 ml of stabilization agents set forth in Table I. The polymerizations were conducted at 65° C under a pressure of 20 to 22 bars until a concentration of polytetrafluoroethylene between about 25 and 30% was obtained. The results reported in Table I show the particularly favorable results obtained with a number of stabilizing agents conforming to the instant invention, especially, carbon tetrachloride, chloroform, difluoromonochlorobromoethane and 1,2-dichloroethane.

Table I

| Stabilization Agent | Concentration of the Dispersion | Quantity of Polymer in the form of a Powder | Stability of the Dispersion |
|---|---|---|---|
| $CCl_4$ | 29.9 | 0 | exceptional |
| $CHCl_3$ | 29.8 | 0 | exceptional |
| $CFCl_3$ | 25.4 | 0 | very high |
| $CF_2Cl\,Br$ | 27.3 | 0 | exceptional |
| $CH_3CCl_3$ | 26.7 | 0 | very high |
| $CH_2ClCH_2Cl$ | 25.3 | 0 | exceptional |
| $CFCl_2-CFCl_2$ | 24.1 | 15 grams | high |
| $C_8F_{17}CH=CH_2$ | 28.2 | 20 grams | high |
| $CHClF_2$ (100 ml of gas) | 26.5 | 10 grams | high |
| none | 19.5 | 300 grams | weak |

We claim:

1. A method for the preparation of mechanically stable, concentrated, aqueous dispersions of polytetrafluoroethylene which comprises polymerizing tetrafluoroethylene dispersed in an aqueous medium containing a polymerization initiator and an emulsifying agent, in the presence of from about 10 to about 10,000 parts per million by weight of said aqueous medium of a stabilizing agent selected from the group consisting of a saturated halogenated acyclic hydrocarbon containing less than about 20 carbon atoms, an unsaturated halogenated acyclic hydrocarbon containing less than about 20 carbon atoms which is not copolymerizable with the tetrafluoroethylene under the reaction conditions, or a mixture of said halogenated hydrocarbons.

2. The method of claim 1 wherein polymerization is carried out at a temperature between about 5° to 100° C and at a pressure between about 1 to 100 bars.

3. The method of claim 1 wherein the polymerization is carried out at a pressure between about 5 and 25 bars.

4. The method of claim 1 wherein the stabilizing agent is carbon tetrachloride.

5. The method of claim 1 wherein the stabilizing agent is chloroform.

6. The method of claim 1 wherein the stabilizing agent is difluoromonochloromonobromethane.

7. The method of claim 1 wherein the stabilizing agent is 1,2-dichloroethane.

8. The method of claim 1 wherein the stabilizing agent is either $C_4F_9CH=CH_2$, $C_6F_{13}CH=CH_2$ or $C_8F_{17}CH=CH_2$; or mixtures of these compounds.

9. The method of claim 1 wherein the stabilizing agent is employed at a level of from about 20 to 500 parts per million by weight of the aqueous medium.

* * * * *